US011048564B2

(12) United States Patent
Dhondse et al.

(10) Patent No.: US 11,048,564 B2
(45) Date of Patent: Jun. 29, 2021

(54) API EVOLUTION AND ADAPTATION BASED ON COGNITIVE SELECTION AND UNSUPERVISED FEATURE LEARNING

(71) Applicant: INTERNATIONAL BUSINESS MACHINES CORPORATION, Armonk, NY (US)

(72) Inventors: Amol Dhondse, Kothrud (IN); Anand Pikle, Pune (IN); Harish Bharti, Pune (IN); Rajesh Saxena, Mumbai (IN); Abhay Patra, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

(21) Appl. No.: 16/138,153

(22) Filed: Sep. 21, 2018

(65) Prior Publication Data

US 2020/0097338 A1 Mar. 26, 2020

(51) Int. Cl.
| | |
|---|---|
| *G06N 7/08* | (2006.01) |
| *G06F 9/54* | (2006.01) |
| *G06N 3/08* | (2006.01) |
| *G06F 11/34* | (2006.01) |
| *G06K 9/62* | (2006.01) |
| *G06N 3/04* | (2006.01) |

(52) U.S. Cl.
CPC ............ *G06F 9/54* (2013.01); *G06F 11/3495* (2013.01); *G06K 9/6218* (2013.01); *G06K 9/6267* (2013.01); *G06N 3/0481* (2013.01); *G06N 3/088* (2013.01)

(58) Field of Classification Search
CPC ..... G06F 9/54; G06F 11/3495; G06K 9/6218; G06K 9/6267; G06N 3/0481; G06N 3/088
See application file for complete search history.

(56) References Cited

U.S. PATENT DOCUMENTS

| | | | |
|---|---|---|---|
| 6,253,257 B1 | 6/2001 | Dundon | |
| 2015/0254701 A1 | 9/2015 | Laredo et al. | |
| 2016/0092897 A1 | 3/2016 | Natarajan et al. | |
| 2016/0239546 A1* | 8/2016 | Cuomo | G06F 16/248 |
| 2016/0292018 A1 | 10/2016 | Laredo | |

(Continued)

OTHER PUBLICATIONS

Matthew et al "Unsupervised Learning a Dynamic Approach" (Year: 2014).*

(Continued)

*Primary Examiner* — Doon Y Chow
*Assistant Examiner* — Abdou K Seye
(74) *Attorney, Agent, or Firm* — Nicholas Bowman; Andrew D. Wright; Roberts Calderon Safran & Cole, P.C.

(57) ABSTRACT

A computer-implemented method includes: receiving, by a computing device, information regarding an application programming interface (API); classifying, by the computing device, the API using natural language classification on to a baseline taxonomy; extracting, by the computing device, information regarding features of the API based on the classifying to the baseline taxonomy; performing, by the computing device, an assessment on the API relative to other APIs within a same class as the API based on the extracting the information regarding the API features and the classifying the API; and updating, by the computing device, the API based on the performing the assessment.

20 Claims, 5 Drawing Sheets

(56) References Cited

U.S. PATENT DOCUMENTS

2018/0165554 A1\* 6/2018 Zhang .................. G06K 9/6256
2019/0004873 A1\* 1/2019 Liu ......................... G06F 9/541
2019/0286451 A1\* 9/2019 Awadallah .......... G06F 17/2765

OTHER PUBLICATIONS

Mell et al., "The NIST Definition of Cloud Computing", NIST, Special Publication 800-145, Sep. 2011, 7 pages.

Kirubakaran et al., "Service Discovery Framework with Functional and Non-Functional Information (SDF)", www.jarcsse.com, International Journal of Advanced Research in Computer Science and Software Engineering, vol. 2, Issue 12, pp. 206-210, Dec. 2012, 5 pages.

Ahmed et al., "Dynamic Web Service Discovery Model Based on Artificial Neural Network with QoS Support", International Journal of Scientific & Engineering Research, vol. 3, Issue 3, Mar. 2012, 10 pages.

\* cited by examiner

API EVOLUTION AND ADAPTATION BASED ON COGNITIVE SELECTION AND UNSUPERVISED FEATURE LEARNING

BACKGROUND

The present invention generally relates to application programing interface (API) evolution and adaptation and, more particularly, to API evolution and adaptation based on cognitive selection and unsupervised feature learning.

In computer programming, an application programming interface (API) is a set of subroutine definitions, protocols, and tools for building software. In general terms, API refers to a set of defined methods of communication between various components. An API facilitates the development of a computer program by providing all the building blocks, which are then arranged by the programmer. An API may be for a web-based system, operating system, database system, computer hardware, or software library. An API specification can take many forms, but often includes specifications for routines, data structures, object classes, variables, or remote calls. As an example, an API for file input/output provides the developer a function that copies a file from one location to another without requiring that the developer understand the file system operations occurring behind the scenes.

Web or cloud-based APIs are interfaces through which interactions occur between an enterprise and applications that use its assets, which also is a Service Level Agreement (SLA) to specify the functional provider and expose the service path or URL for its API users. An API approach is an architectural approach that revolves around providing a program interface to a set of services to different applications serving different types of consumers. As an example, a shipping company API can be added to an eCommerce-focused website, to facilitate ordering shipping services and automatically include current shipping rates, without the site developer having to enter the shipper's rate table into a web database. Web APIs allow the combination of multiple APIs into new applications. In the social media space, web APIs allow web communities to facilitate sharing content and data between communities and applications.

Enterprises are moving towards monetizing data and insights derived from analytics, to combine applications, data, partners and customers into a single, inter-connected eco-system (e.g., using APIs). The number of open APIs has continued to grow at a substantial rate.

SUMMARY

In an aspect of the invention, a computer-implemented method includes: receiving, by a computing device, information regarding an application programming interface (API); classifying, by the computing device, the API using natural language classification on to a baseline taxonomy; extracting, by the computing device, information regarding features of the API based on the classifying to the baseline taxonomy; performing, by the computing device, an assessment on the API relative to other APIs within a same class as the API based on the extracting the information regarding the API features and the classifying the API; and updating, by the computing device, the API based on the performing the assessment.

In an aspect of the invention, there is a computer program product comprising a computer readable storage medium having program instructions embodied therewith. The program instructions are executable by a computing device to cause the computing device to: receive information regarding an application programming interface (API); classify the API using natural language classification on to a baseline taxonomy; extract information regarding features of the API based on the classifying to the baseline taxonomy; perform an assessment on the API relative to other APIs within a same class as the API based on the extracting the information regarding the API features and the classifying the API; update the API based on the performing the assessment; and output a report of the assessment.

In an aspect of the invention, a system includes: a processor, a computer readable memory and a computer readable storage medium associated with a computing device; program instructions to receive information regarding an application programming interface (API); program instructions to classify the API using natural language classification on to a baseline taxonomy; program instructions to extract information regarding features of the API based on the classifying to the baseline taxonomy; program instructions to identify the features from a representative set of data values associated with the API based on the extracting the information regarding the features of the API; program instructions to apply syndication detection, based on the identifying the features, to directly identify the probability of salient regions in the representative set of data values that are distinctive with respect to both their local and global surroundings; program instructions to perform an assessment on the API relative to other APIs within a same class as the API based on the extracting the information regarding the API features, the classifying the API, and the applying syndication detection; and program instructions to update the API based on the performing the assessment. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
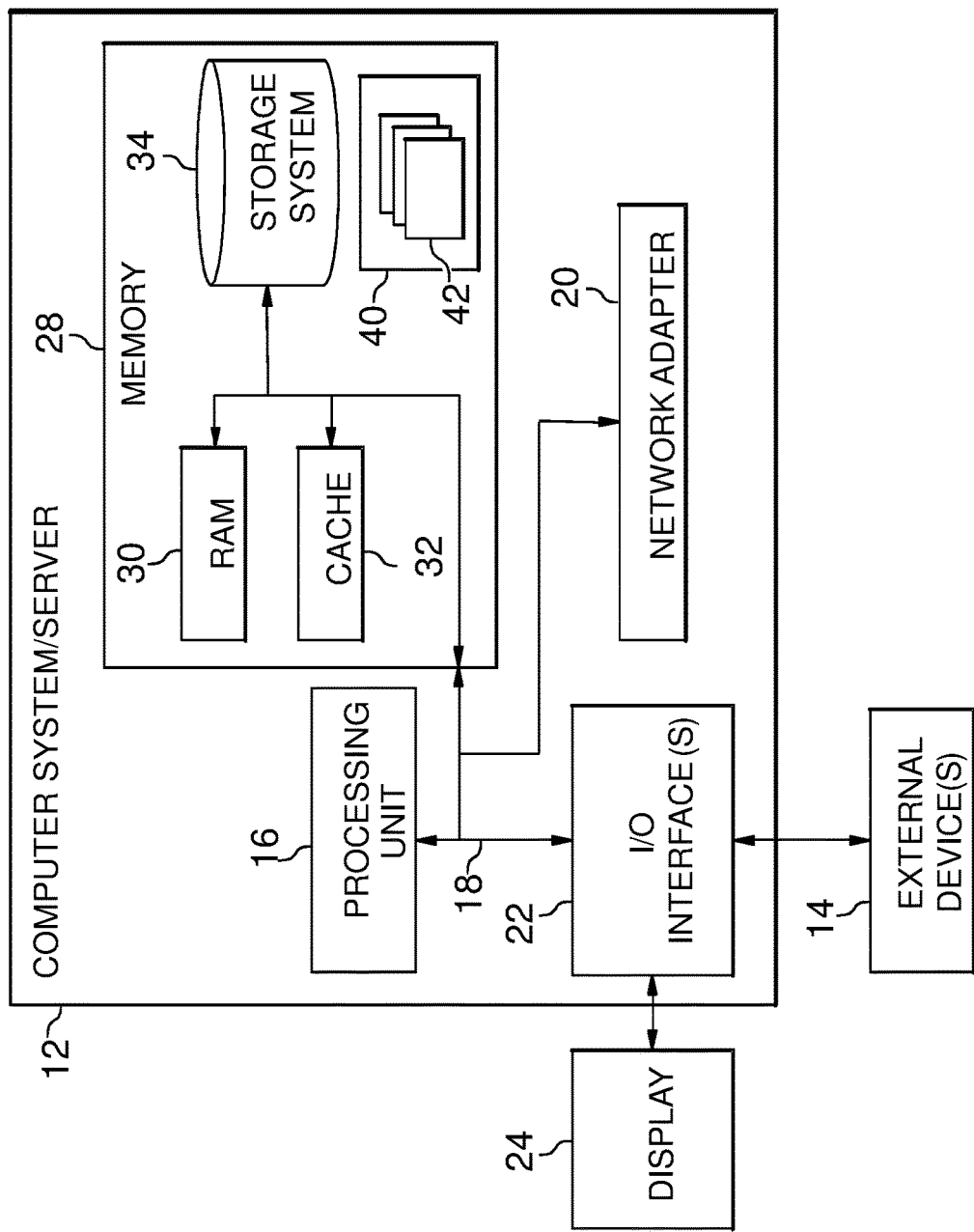
FIG. 1 depicts a cloud computing node according to an embodiment of the present invention.

The present invention generally relates to API evolution and adaptation and, more particularly, to API evolution and adaptation based on cognitive selection and unsupervised feature learning. API management by developers face evolutionary challenges due to a bottoms-up, static and human activity driven approach, resulting in excessive spending and lengthy cycles in service governance. For example, no standard and/or automated mechanism exists to determine key direct API features (e.g., features visible and actively used by the API user) and/or indirect API features (e.g., performance related metrics and back-end features) vis-a-vis other API and/or API providers that drive consumption and market value. Moreover, no consistent mechanism exists to API providers to quickly identify, adapt, and/or invest in features and policies that enhance market value by continuous and competitive evaluation of the quality and relevance of the API.

Accordingly, aspects of the present invention perform an evolution assessment that provides a self-adaptive and automated mechanism to determine key direct and/or indirect API features via-a-vis other API and/or API providers that drive consumption, command premium pricing and market value. Aspects of the present invention incorporate a scoring model that benchmarks key features on the basis of closeness of function and characteristics of similar features present in other APIs that provide similar functions. Aspects of the present invention provide the ability to apply cognitive computing, natural language processing, and/or artificial intelligence reasoning and discernment to identify, adapt and invest in features and policies that enhance market value by continuous and competitive evaluation of the quality and relevance of an API.

In embodiments, aspects of the present invention performs evolution assessments on APIs to continuously identify and prioritize API features and policies that enhance market value and evaluate how APIs are evolving over time. For example, aspects of the present invention provide continuous and competitive evaluation of the quality and relevance of an API against other APIs in similar category/topic across one or more providers using supervised learning models, at atomic and/or aggregated level. For example, features that are commanding premium pricing may be determined at individual API or for a sub-portfolio (e.g., the retrieval of account details) based on benchmarking of characteristics across similar APIs in a portfolio.

In embodiments, aspects of the present invention classify direct and indirect characteristics of an API based on closeness of the characteristics at similar level and/or distance from parent nodes in an API portfolio hierarchy within a domain area. In embodiments, aspects of the present invention classify the API using a range of inputs such as domain and industry standards, business taxonomies and/or business process. As an example, to perform a relevant comparison of the indirect characteristics across semantically and APIs directly related to invoicing and payables within a supply chain, aspects of the present invention implement a learning model that factors in other financial accounting characteristics, such as extent of country-specific taxation, business validations etc. across the API.

Aspects of the present invention dynamically calculate and continuously evolve the market worthiness scores, limits and thresholds associated to API features and functions that are determined as driving (or not driving) market value. For example, aspects of the present invention implement a continuous discovery process by comparison of API metadata and literature across providers within a business context, based on design time and operational feedback. Aspects of the present invention employ syndication guided sampling strategy, with syndication detection and context-aware syndication to identify API attributes which are missing but determined to be of importance.

Aspects of the present invention provide the ability to iteratively refine the opportunity value associated to individual APIs and their features which support and reinforce the business case for preferential investment by continuous refinement of weightage tied to each feature. Aspects of the present invention incorporate supervising user/subject matter expert (SME) input, historical feedback, reviews, forums, ratings and/or evolving domain corpus to iteratively refine the opportunity value associated to individual APIs. In embodiments, an unsupervised feature learning algorithm is used to discover the features in unlabeled data. Aspects of the present invention incorporate the use of an autoencoder as a symmetrical neural network that is used to learn the features of the dataset in an unsupervised manner.

Aspects of the present invention select the strongest API characteristics that are driving consumer value based on comparative evaluation against APIs with similar characteristics (e.g., availability, supply cost of collection/aggregation of the input data sets, etc.). For example, API security may be the most valuable characteristic in a financial services API that returns personally identifiable information (PII) about a customer whereas another characteristic for another type of API may be considered to be more valuable. Aspects of the present invention may intelligently recognize the most valuable characteristics for specific types of APIs by employing the processes described herein and provide information to API developers to prioritize the development and/or advertising of these characteristics while reducing resources and efforts to API features that are considered lower value. In this way, computing resources are more efficiently allocated by prioritizing the development of the most valuable features in an API. More specifically, aspects of the present invention generate a report to identify suggestions for prioritizing features, market worthiness scores, and other pertinent information to allow API developers to evolve and update APIs and API libraries. Additionally, or alternatively, aspects of the present invention automatically update API functionality by removing features whose market worthiness scores do not satisfy a threshold, thus conserving computing resources for non-value add functions.

As described herein, aspects of the present invention provide a technical solution to a specific problem. In particular, aspects of the present invention solve the problem of determining API features that have high value and adapting APIs to enhance API value. For example, aspects of the present invention solve this problem through the continuous and competitive evaluation of the quality and relevant of APIs using cognitive computing techniques, natural language classification techniques, or the like. Aspects of the present invention continuously evaluate external data sources in order to solve the problem of determining API features that have high value and adapting APIs to enhance API value in a manner that is not humanly possible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
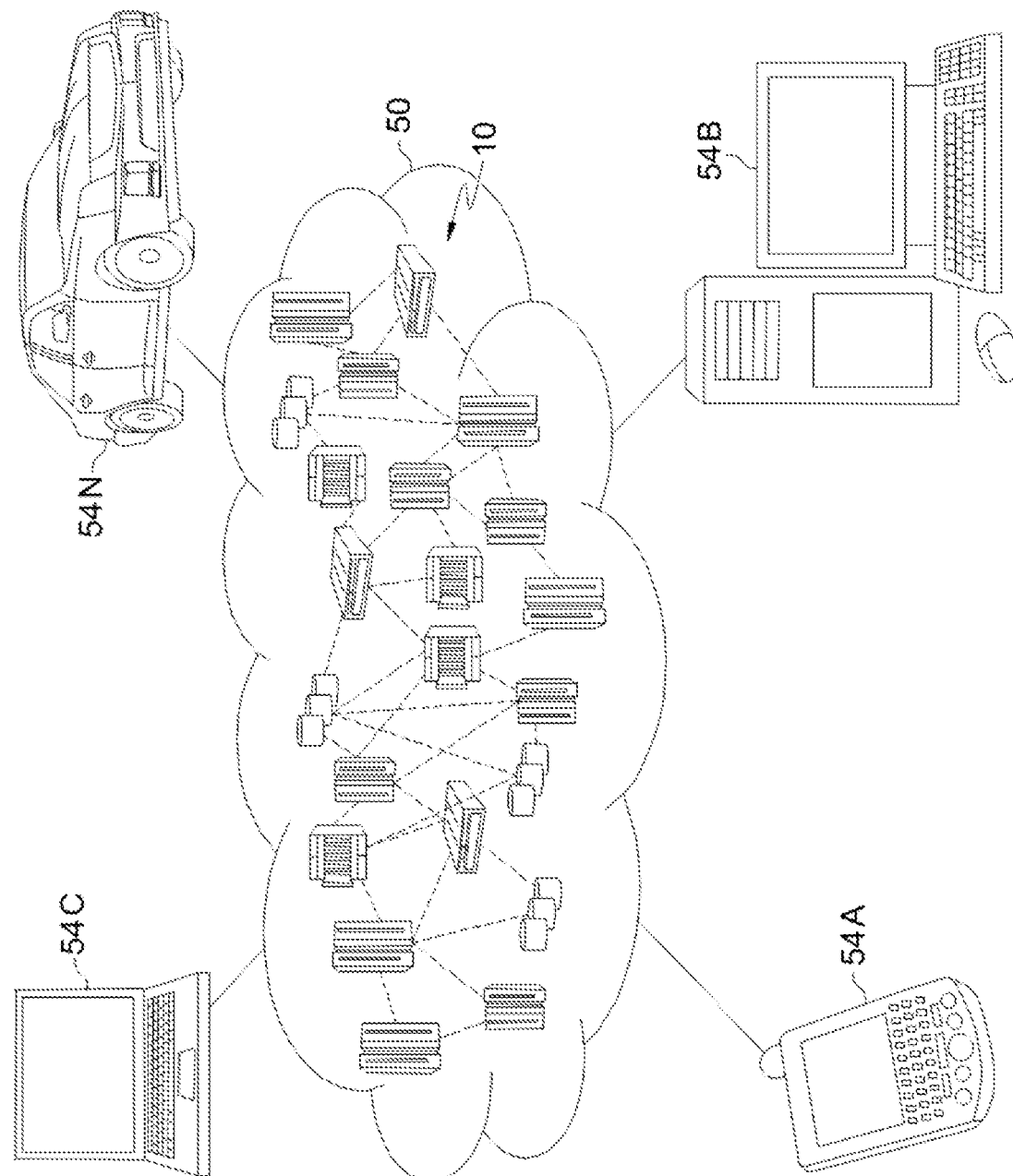
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
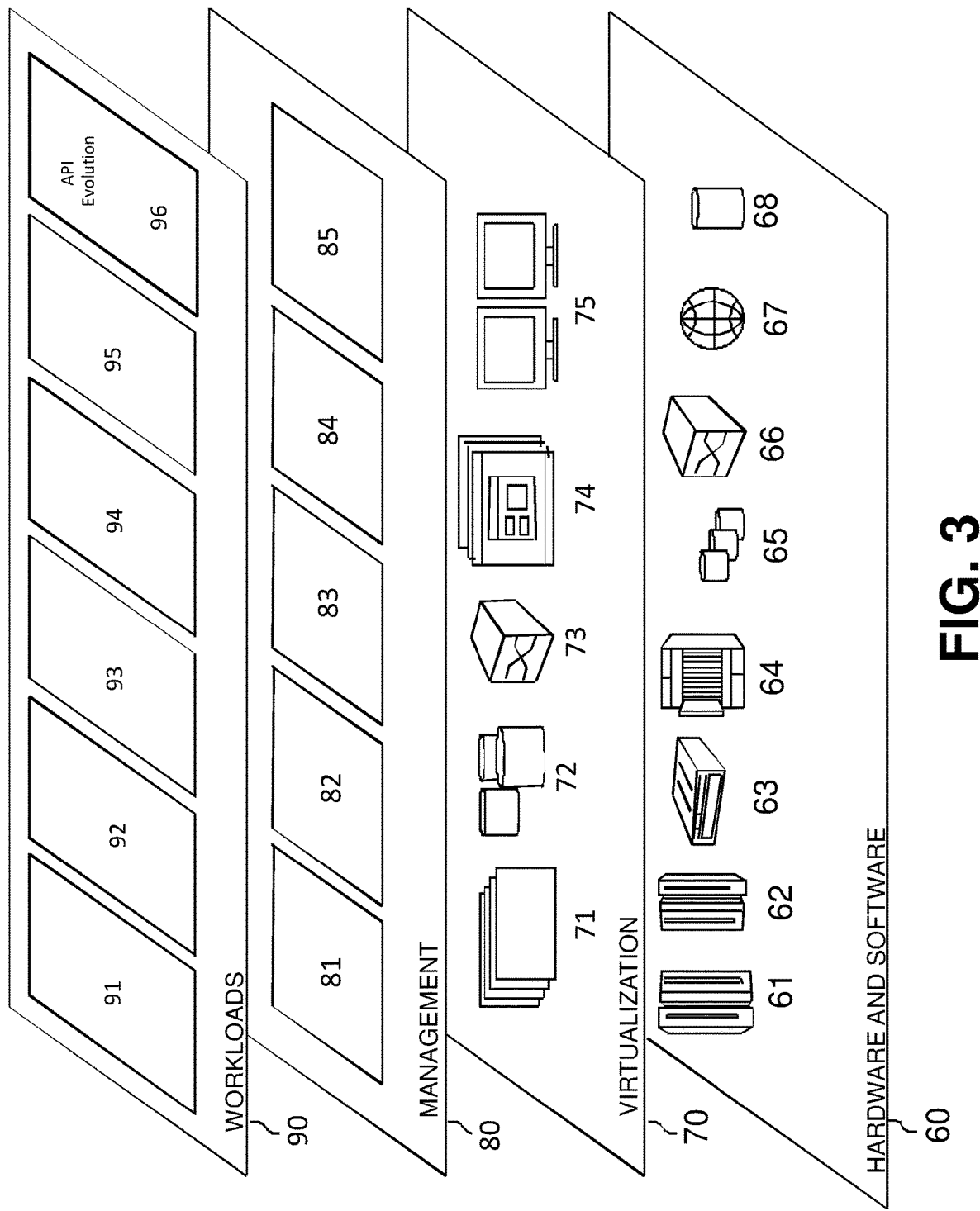
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API evolution 96.

Referring back to FIG. 1, the program/utility 40 may include one or more program modules 42 that generally carry out the functions and/or methodologies of embodiments of the invention as described herein (e.g., such as the functionality provided by API evolution 96). Specifically, the program modules 42 may monitor external data regarding the value of API features, classify APIs, extract information regarding API features, perform evolution assessment of an API, update APIs based on the evolution assessment, and/or output information regarding the evolution assessment to guide API development decisions. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of an API evolution system 210 as shown in FIG. 4.

Figure 4:
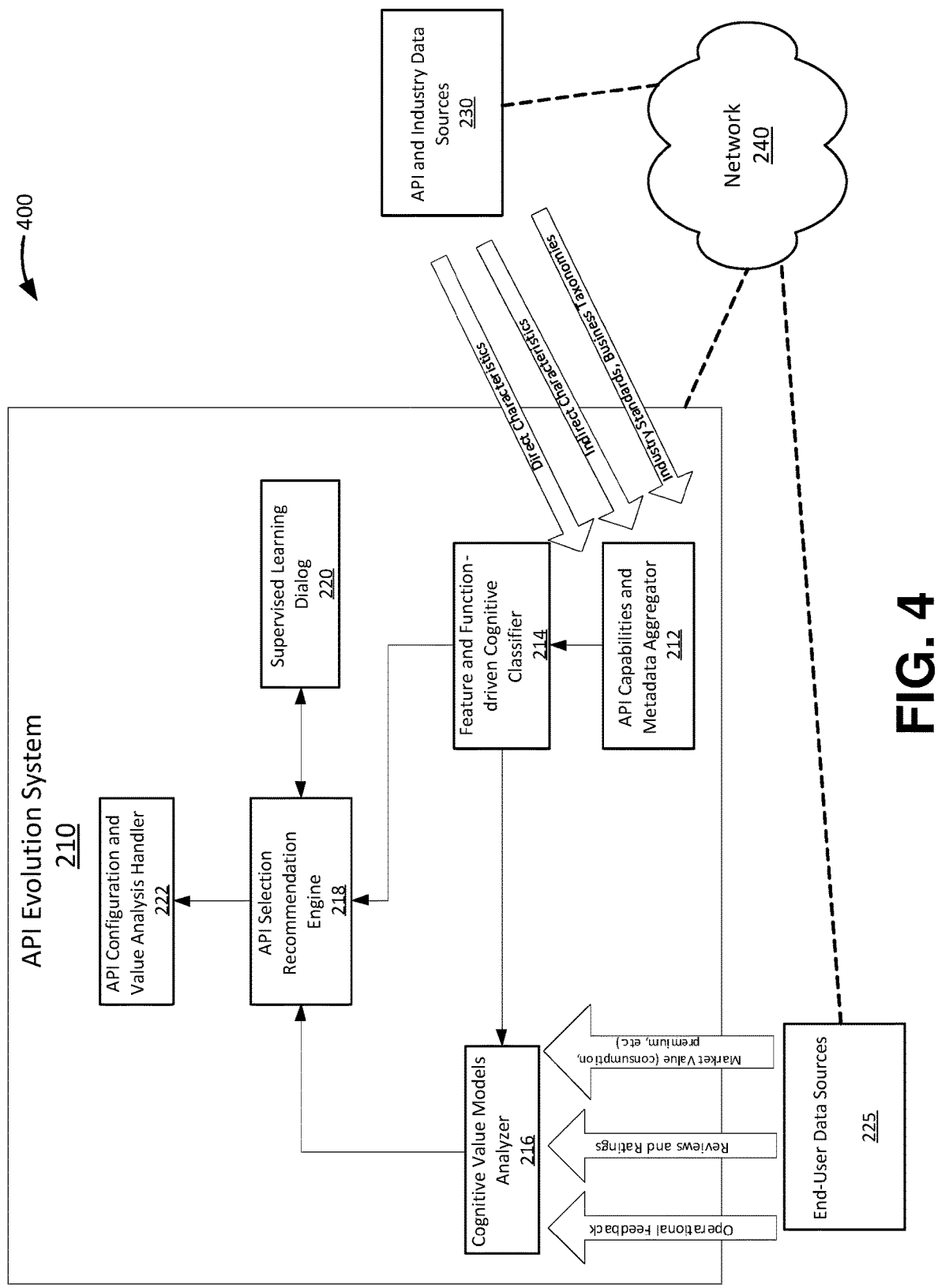
FIG. 4 shows an overview of an example implementation and environment in accordance with aspects of the present invention

FIG. 4 shows an overview of an example implementation and environment in accordance with aspects of the present invention. As shown in FIG. 4, environment 400 includes an API evolution system 210, end-user data sources 225, API and industry data sources, and a network 240. In embodiments, one or more components in environment 400 may correspond to one or more components in the cloud computing environment of FIG. 2. In embodiments, one or more components in environment 400 may include components of the computer system/server 12 of FIG. 1.

The API evolution system 210 includes one or more computing devices (e.g., such as computer system/server 12 of FIG. 1). As shown in FIG. 4, in an example embodiment, the API evolution system 210 includes functional components, such as an API capabilities and metadata aggregator 212, a feature and function-driven cognitive classifier 214, a cognitive value models analyzer 216, an API selection recommendation engine 218, a supervised learning dialog 220, and an API configuration and value analysis handler 222. In embodiments, the API capabilities and metadata aggregator 212 aggregates and builds a corpus capturing API capabilities and metadata across different API and API providers. For example, the API capabilities and metadata aggregator 212 receives (e.g., from the API and industry data sources) information identifying API direct characteristics, indirect characteristics, industry standards, and business taxonomies. As described herein, direct characteristics include those features visible and actively used by the API user, such as features to allow the user to search account information, search transaction history, search shopping history, identify location information, and/or other features related to the services and types of data provided by the API. In embodiments, indirect characteristics include performance related metrics and back-end features, such as data processing accuracy/consistency, quality of service, and/or other performance metrics.

In embodiments, the feature and function-driven cognitive classifier 214 performs cognitive classification of various API characteristics based on natural language classification and domain/industry inputs. The cognitive value models analyzer 216 performs competitive evaluation of an API against similar APIs of similar classifications/types, adjusts API features and scoring weightages based on market value. In embodiments, the cognitive value models analyzer 216 provides the ability to build models based on API features for determining value across multiple dimensions. In embodiments, the cognitive value models analyzer 216 receives end-user data from end-user data sources 225 to perform the competitive evaluation of an API. For example, the cognitive value models analyzer 216 receives, from the end-user data sources 225, operational feedback information, reviews and ratings information, and/or market value information related to APIs.

In embodiments, the API selection recommendation engine 218 provides recommendations on API and API features in which to prioritize and/or invest based on cognitive classification visa-vis market value, and/or learning models that use historical data and market value. The supervised learning dialog 220 enables expert/SME validation via a dialog-based user interface that enables adjustment of weightages associated to specific features that drive market value. The API configuration and value analysis handler 222 enables API administrators to determine API features and functions expected to drive higher market value versus those that do not. For example, the API configuration and value analysis handler 222 may output a report identifying scores of market values associated with APIs and API features.

The end-user data sources 225 and API and industry data sources 230 include one or more computing devices (e.g., such as computer system/server 12 of FIG. 1) that provide external data to the API evolution system 210. For example, the end-user data sources 225 may provide end-user data to the cognitive value models analyzer 216 from which the cognitive value models analyzer 216 performs competitive evaluation of the API. In embodiments, the API and industry data sources 230 provide industry API data to the API capabilities and metadata aggregator 212 to allow the API capabilities and metadata aggregator 212 to aggregate and build a corpus capturing API capabilities and metadata across different API and API providers.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (4G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

In embodiments, the supervised learning dialog 220 performs supervised learning of API selections based on the similarly of features expected to drive higher market value. In embodiments, attributes or features of individual API deployments are extracted using a supervised learning based guided sampling strategy. These features are defined in terms of affinity and proximity within a dataset of data related to API features from individual API deployments.

In embodiments, the supervised learning dialog 220 performs clustering, which is the classification of objects into different groups, or more precisely, the partitioning of a data set into subsets (clusters), so that the data in each subset share some common trait, such as proximity according to a distance measure. In embodiments, data clustering is used for statistical data analysis. Each cluster having points that are similar (e.g., relatively close in distance with respect to a threshold) and points of different clusters are dissimilar (e.g., exceeding a distance with respect to a threshold).

In an example embodiment, syndication detection (e.g., context-aware syndication) is employed for supervised learning of API selections. The syndication detection directly shows the probability of salient regions in a dataset (e.g., a dataset identifying API features) that are distinctive with respect to both their local and global surroundings. As an illustrative, non-limiting example, using the following equation:

$$d_{proximity}(x^i, x^j) = \text{Euclidean distance between } x^i, x^j \quad (1)$$

$$d_{affinity}(x^i, x^j) = \text{Euclidean distance between } x^i, x^j \quad (2)$$

the values for $d_{proximity}$ and $d_{affinity}$ are normalized to [0,1]. The dissimilarity between the pair of data values is determined as follows:

$$d(x^i, x^j) = \frac{d_{proximity}(x^i, x^j)}{1 + c \cdot d_{affinity}(x^i, x^j)} \quad (3)$$

where C is a constant and given that maximum dimensionality allowed for this problem will be set as 4, c is set at 3 for higher degree of freedom required to resolve the problem of dimensionality. Thus, C=3. A data value is salient if $d(x^i, x^j)$ exceeds a threshold. Hence, for every feature $x^i$, the K most similar data values are searched (if the most similar data values are highly different to $x^i$, then all data values are highly different to $x^i$). Therefore, the syndication guided value of $x^i$ is defined as follows:

$$S^i = 1 - \exp\left\{-\frac{1}{K}\sum_{k=1}^{K} d(x^i, x^j)\right\} \quad (4)$$

In embodiments, a multiscale syndication value is used to measure the saliency of a data value. These are normally used as logarithmic intercepts of natural base, thus, 100%, 80%, 50%, and 30%. As described herein, the above syndication detection technique is a merely an example of performing supervised learning of API selections. In alternative embodiments, other techniques, operations, and/or models may be used.

In embodiments, the API selection recommendation engine 218 performs unsupervised learning to further optimize API selections based on unlabeled feature data and learnings. In an example embodiment the unsupervised learning may be performed by extracting direct and indirect functional API feature classes using an unsupervised feature learning algorithm to discover the features in unlabeled data (e.g., data from the API and industry data sources 230 that is unlabeled). In one illustrative non-limiting example, the unsupervised feature learning algorithm learns features from a representative set of data values sampled from a dataset (e.g., of API features) using the features across a total group of API data across an entire industry. Thus, buckets of X features are taken from the sampled dataset and output as a function defined as follows:

$$f : R^N \rightarrow R^K \quad (5)$$

Equation 5 maps a new vector $x^i$ to a new feature vector by the K features. In embodiments, to rank the API across the API network, the API configuration and value analysis handler 222 uses an autoencoder as a symmetrical neural network to learn the features of the dataset in an unsupervised manner. This is done by minimizing the reconstruction error between the input data at the encoding layer and its reconstruction at the decoding layer. During the encoding, an input vector $x^i \in R^K$ is processed by applying a linear mapping and a nonlinear activation function to the network from which the following equation is produced:

$$\alpha^i = f(x) = g(W_1 x^i + b_1) \quad (6)$$

where, $W_1 \in R^{K \times N}$ is a weight matrix with K features, $b_1 \in R^K$ is the encoding bias, $$g(x) \equiv \frac{1}{(1 + e^{-x})}$$

is a logistic sigmoid function. In embodiments, a vector is decoded using a separate linear decoding matrix $$Z^i = (W_2^T \alpha + b_2) \quad (7)$$

where, $W_2 \in R^{K \times N}$ is a weight matrix with K features, $b_2 \in R^K$ is the encoding bias.

As described herein, the above unsupervised learning algorithm is a merely an example of performing unsupervised learning to further optimized API selections. In alternative embodiments, other techniques, operations, and/or models may be used for the unsupervised learning.

In embodiments, the feature and function-driven cognitive classifier 214 performs cognitive classification of various API characteristics based on natural language classification that drives clustering of similarity between features driving market value and features extracted from APIs. In an example embodiment, the cognitive classification is performed using feature extractors in the data set are learned by minimizing a cost function in which a first term in a reconstruction of the cost function is the error term. A second term in the reconstruction is a regularization term (also called a weight decay term in a neural network). Finally, a selection model is produced as follows:

$$J(X, Z)_i = \frac{1}{2}\sum_{i=1}^{m} \|x^i - z^i\|^2 + \frac{s^i}{2} \cdot \|W\|^2 \quad (8)$$

where X is the Training data, Z is reconstructed data. From equation 1 the most fitted values trained over an explicit dataset are obtained such that the corresponding features are used to build a J-score (e.g., a score that identifies relevancy of an API with respect to context of requirement). In embodiments, the classification performance is improved by increasing the number of learned features.

In an example implementation, learning rules are employed using sparse autoencoder learning to minimize the reconstruction error with a sparsity constraint, i.e., a sparse autoencoder. In embodiments, this is done using Kullback-Leibler divergence where backpropagation and Limited-memory Broyden-Fletcher-Goldfarb-Shanno (L-BFGS) to train the model. The syndication over the trained data set can be used, which has been refined to $\hat{J}$ as, $$P_i = J(X, Z)_i \forall \hat{J}_t \in \left\{ J(X, Z)_i + \beta \sum_{j=1}^{K} KL\left(\frac{1}{m}\sum_{i=1}^{m} \lceil c^i \rceil\right) \right\} \quad (9)$$

An ordered set is produced so that the best selection can be achieved according to the backpropagation assortment.

$$\{(P_{API\text{-}evolution})\} \leftarrow \{P_i :: \exists P \leftarrow (D_H \cup D_M \cup D_L)_i | \{D_H, D_L, D_M\} \in \{G\}\} \quad (10)$$

As described herein, the above is a merely an example of performing cognitive classification of API characteristics. In alternative embodiments, other techniques, operations, and/or models may be used for the cognitive classification of API characteristics.

Figure 5:
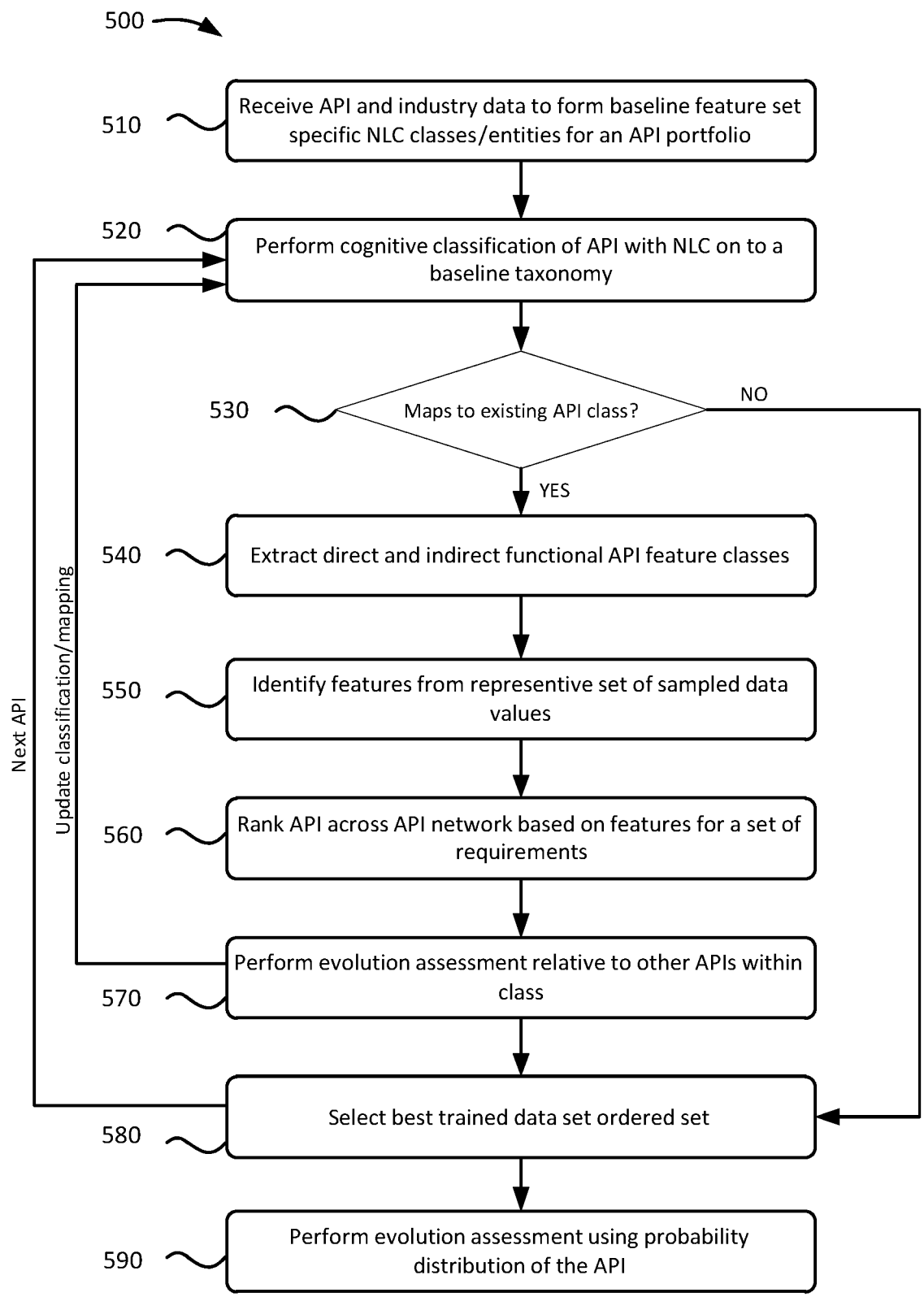
FIG. 5 shows an example flowchart of a process for performing an evolution assessment of APIs for prioritizing high value API features for development and investing in accordance with aspects of the present invention.

FIG. 5 shows an example flowchart of a process for performing an evolution assessment of APIs for prioritizing high value API features for development and investing. In accordance with aspects of the present invention, the steps of FIG. 5 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 5, process 500 includes receiving API and industry data to form baseline feature set specific Natural Language Classification (NLC) classes/entities for an API portfolio (step 510). For example, the API capabilities and metadata aggregator 212 of the API evolution system 210 receives, from the API and industry data sources 230, API and industry data regarding APIs, such as direct characteristics, indirect characteristics, industry standards, business taxonomies, etc. As described herein, direct characteristics include those features visible and actively used by the API user, such as features to allow the user to search account information, search transaction history, search shopping history, identify location information, and/or other features related to the services and types of data provided by the API. In embodiments, indirect characteristics include performance related metrics and back-end features, such as data processing accuracy/consistency, quality of service, and/or other performance metrics. From the data received from the API and industry data sources, the API capabilities and metadata aggregator 212 forms a baseline feature set specific NLC classes/entities for an API portfolio.

Process 500 also includes performing cognitive classification of an API with NLC on to a baseline taxonomy (step 520). For example, the feature and function-driven cognitive classifier 214 of the API evolution system 210 performs cognitive classification of the API using NLC to classify the API on to a baseline taxonomy. In embodiments, the feature and function-driven cognitive classifier 214 performs cognitive classification using the techniques described above with respect to FIG. 4, such as using equation 8 above.

Process 500 further includes determining whether the classified API maps to an existing API class (step 530). For example, the feature and function-driven cognitive classifier 214 of the API evolution system 210 determines whether the API classified at step 520 maps to a previously determined classification. If, for example, the classified API maps to an existing API class, process 500 continues to step 540. If on the other hand, the classified API does not map to an existing API class, process 500 continues to step 580.

Process 500 also includes extracting direct and indirect functional API feature classes (step 540). For example, the feature and function-driven cognitive classifier 214 of the API evolution system 210 extracts direct and indirect functional API feature classes. In embodiments, the features are extracted using feature extractors as described above with respect to FIG. 4, and for example, using equation 8.

Process 500 further includes identifying features from a represented set of sampled data values (step 550). For example, the feature and function-driven cognitive classifier 214 identifies features from a set of sample data values corresponding to the features extracted at step 540.

Process 500 further includes ranking the API across the API network based on features for a set of requirements (step 560). For example, the API selection recommendation engine 218 ranks the API across the API network based on the features for a set of requirements (e.g., API requirements received by an administrator or user). In embodiments, the ranking of the API is based on a context of the API with respect to a different set of requirements in a given network.

Process 500 further includes performing an evolution assessment relative to other APIs within the class (step 570). For example, the API selection recommendation engine 218 of the API evolution system 210 performs an evolution assessment relative to other APIs within the class, for example using a sparse autoencoder learning to minimize the reconstruction error with a sparsity constraint as described above (e.g., using equation 9). As described herein, in embodiments, the evolution assessment includes an evaluation of the various features and services provided by an API, and the value of these features with respect to business goals and market value. In embodiments, the evolution assessment includes competitive evaluation of the quality and relevance of the API and its features, and insights as to how an API of a particular class is evolving over time. For example, in embodiments, the evolution assessment provides insights that identify API features and functions that drive and enhance market value (e.g., API features relating to performing in-demand tasks and functions in which the in-demand tasks and functions are determined by industry trends).

Process 500 also includes selecting the best trained data set ordered set (step 580). For example, the API selection recommendation engine 218 of the API evolution system 210 selects the best trained data set ordered set according to a backpropagation assortment (e.g., using equation 10)

Process 500 further includes performing evolution assessment using a probability distribution of the API (step 590). For example, the API selection recommendation engine 218 of the API evolution system 210 performs an evolution assessment by applying a probability distribution of the API.

As shown in FIG. 5, once the evolution assessment has been performed relative to the other APIs, the classifications/mappings are updated and process 500 returns to step 520. Also, once the best trained data set ordered set is selected, process 500 returns to step 520 for the next API.

In embodiments, the API evolution system 210 outputs a report that identifies the evolution assessment and more specifically, identifies key features and APIs that should be prioritized for investment, advertising, and development. Additionally, or alternatively, the evolution assessment identifies APIs that are considered to be of lower value for which an API developer may wish to consider discontinuing in order to prioritize computing and development resources on higher value APIs. In embodiments, the API evolution system 210 uses the evolution assessment to automatically update APIs by removing unused and/or low value features and interfaces such that an API consumes less computer processing resources for low value features, thus saving computer processing resources. In embodiments, the system automatically updates APIs by identifying and removing underlying low value features and interfaces and removing dependencies to those low value features when high value features are able to function without the low value features. In embodiments, the system automatically updates APIs by for example by releasing a new version, sending a notification (e.g., message, push notification, etc.) that a new version has been released, generating a report for a developer to use to update the API, or the like. In embodiments, low value features are identified and confirmed for removal by an administrator prior to removal. Additionally, or alternatively, an entire low value API is removed from an API suite or library, thereby saving computing processing and storage resources.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computing device, information regarding an application programming interface (API);
    classifying, by the computing device, the API using natural language classification on to a baseline taxonomy;
    learning, by the computing device, features of the API by minimizing a reconstruction error between input data at an encoding layer of the API and a reconstruction at a decoding layer of the API by using an autoencoder as a symmetrical neural network;
    ranking, by the computing device, the features of the API across an API network for a set of API requirements;
    extracting, by the computing device, information regarding the features of the API based on the classifying to the baseline taxonomy;
    discovering, by the computing device, unlabeled information within the extracted information by extracting direct and indirect functional API feature classes;
    performing, by the computing device, an assessment on the API relative to other APIs within a same class as the API based on the set of API requirements and the extracting the information regarding the API features, the discovered unlabeled information and the classifying the API; and
    updating, by the computing device, the API based on the performing the assessment.

2. The computer-implemented method of claim 1, wherein the updating comprises removing features having a value lower than a threshold, wherein the value is based on the assessment.

3. The computer-implemented method of claim 1, further comprising identifying the features from a representative set of data values associated with the API, wherein:
    the performing the assessment is further based on the identifying the features from the representative set of data values, and
    the assessment is an evolution assessment that provides insights that identify features or functions that drive and enhance market value.

4. The computer-implemented method of claim 3, wherein the performing the assessment is further based on the ranking the API features.

5. The computer-implemented method of claim 4, wherein during encoding, an input vector $x^i \in R^K$ is processed by applying a linear mapping and a nonlinear activation function to the network producing the equation: $\alpha^i = f(x) = g(W_1 x^i + b_1)$ where, $W_1 \in R^{K \times N}$ is a weight matrix with K features, $b_1 \in R^K$ is the encoding bias, $$g(x) \equiv \frac{1}{(1+e^{-X})}$$

is a logistic sigmoid function.

6. The computer-implemented method of claim 1, further comprising identifying the features from a representative set of data values associated with the API and applying syndication detection to directly identify a probability of salient regions in the representative set of data values that are distinctive with respect to both their local and global surroundings.

7. The computer-implemented method of claim 6, wherein the syndication detection comprises identifying a Euclidean distance between a pair of the values in the set of data values.

8. The computer-implemented method of claim 7, wherein the Euclidean distance is used to determine a dissimilarity between the pair of data values.

9. The computer-implemented method of claim 6, wherein a multiscale syndication value is used to measure a saliency of a data value in the representative set of data values.

10. The computer-implemented method of claim 1, wherein a service provider at least one of creates, maintains, deploys and supports the computing device.

11. The computer-implemented method of claim 1, wherein the receiving the information regarding the API, the classifying the API, the extracting the information regarding features of the API, the performing the assessment, and the updating the API are provided by a service provider on a subscription, advertising, and/or fee basis.

12. The computer-implemented method of claim 1, wherein the computing device includes software provided as a service in a cloud environment.

13. The computer-implemented method of claim 1, further comprising deploying a system comprising providing a computer infrastructure operable to perform the receiving the information regarding the API, the classifying the API, the extracting the information regarding features of the API, the performing the assessment, and the updating the API.

14. A computer program product, the computer program product comprising a computer readable storage medium having program instructions embodied therewith, the program instructions executable by a computing device to cause the computing device to:
- receive information regarding an application programming interface (API);
- classify the API using natural language classification on to a baseline taxonomy;
- map the classified API to a previously determined API classification;
- learn features of the API by minimizing a reconstruction error between input data at an encoding layer of the API and a reconstruction at a decoding layer of the API by using an autoencoder as a symmetrical neural network;
- rank the features of the API across an API network for a set of API requirements;
- extract information regarding the features of the API based on the classifying to the baseline taxonomy in response to the classified API mapping to the previously determined API classification;
- perform an assessment on the API relative to other APIs within a same class as the API based on the set of API requirements and the extracting the information regarding the API features and the classifying the API;
- update the API based on the performing the assessment; and
- output a report of the assessment.

15. The computer-program product of claim 14, wherein the report identified recommendations on API and API features in which to prioritize and/or invest.

16. The computer-program product of claim 14, wherein the updating comprises removing features having a value lower than a threshold, wherein the value is based on the assessment.

17. The computer-program product of claim 14, wherein the program instructions further cause the computing device to identify the features from a representative set of data values associated with the API, wherein the performing the assessment is further based on the identifying the features from the representative set of data values.

18. The computer-program product of claim 17, wherein the program instructions further cause the computing device to apply syndication detection to directly identify a probability of salient regions in the representative set of data values that are distinctive with respect to both their local and global surroundings.

19. A system comprising:
- a processor, a computer readable memory and a computer readable storage medium associated with a computing device;
- program instructions to receive information regarding an application programming interface (API);
- program instructions to classify the API using natural language classification on to a baseline taxonomy;
- program instructions to map the classified API to a previously determined API classification;
- program instructions to learn features of the API by minimizing a reconstruction error between input data at an encoding layer of the API and a reconstruction at a decoding layer of the API by using an autoencoder as a symmetrical neural network;
- program instructions to rank the features of the API across an API network for a set of API requirements;
- program instructions to extract information regarding the features of the API based on the classifying to the baseline taxonomy in response to the classified API mapping to the previously determined API classification;
- program instructions to identify the features from a representative set of data values associated with the API based on the extracting the information regarding the features of the API;
- program instructions to apply syndication detection, based on the identifying the features, to directly identify a probability of salient regions in the representative set of data values that are distinctive with respect to both their local and global surroundings;
- program instructions to discover unlabeled features within the extracted information by extracting direct and indirect functional API feature classes;
- program instructions to perform an assessment on the API relative to other APIs within a same class as the API based on the set of API requirements and the extracting the information regarding the API features, the classifying the API, the discovered unlabeled information and the applying syndication detection; and
- program instructions to update the API based on the performing the assessment, wherein the program instructions are stored on the computer readable storage medium for execution by the processor via the computer readable memory.

20. The system of claim 19, wherein the updating comprises removing features having a value lower than a threshold, wherein the value is based on the assessment and wherein the syndication detection is refined using the equation:

$$P_i = \hat{J}(X, Z)_i \forall \hat{J}_i \in \left\{ J(X, Z)_i + \beta \sum_{j=1}^{K} KL\left( \frac{1}{m} \sum_{i=1}^{m} \lceil c^i \rceil \right) \right\}$$

where, $J(X,Z)_i$ is a selection model defined as $$J(X, Z)_i = \frac{1}{2} \sum_{i=1}^{m} \|x^i - z^i\|^2 + \frac{s^i}{2} \cdot \|W\|^2.$$

* * * * *